US011427393B2

United States Patent
Bevier (10) Patent No.: US 11,427,393 B2
(45) Date of Patent: Aug. 30, 2022

(54) RELEASABLE PAPERBOARD CHOCK ASSEMBLY

(71) Applicant: INTERNATIONAL PAPER COMPANY, Memphis, TN (US)

(72) Inventor: Alex D Bevier, Olive Branch, MS (US)

(73) Assignee: Global Holdings II, Inc., Memphis, TN (US)

( * ) Notice: Subject to any disclaimer, the term of this patent is extended or adjusted under 35 U.S.C. 154(b) by 308 days.

(21) Appl. No.: 16/654,597

(22) Filed: Oct. 16, 2019

(65) Prior Publication Data

US 2020/0047972 A1    Feb. 13, 2020

Related U.S. Application Data

(63) Continuation of application No. PCT/US2019/020871, filed on Mar. 6, 2019.

(60) Provisional application No. 62/640,671, filed on Mar. 9, 2018.

(51) Int. Cl.
*B60P 7/12* (2006.01)
*B65D 81/05* (2006.01)
*B60P 7/08* (2006.01)

(52) U.S. Cl.
CPC .......... *B65D 81/053* (2013.01); *B60P 7/0892* (2013.01); *B60P 7/12* (2013.01)

(58) Field of Classification Search
CPC ......... B60P 7/12; B60P 7/0892; B60P 7/0807; B60P 3/035; B60P 3/077; B65D 85/66
USPC ..... 410/30, 36, 46–47, 49–50, 94, 121, 154, 410/155
See application file for complete search history.

(56) References Cited

U.S. PATENT DOCUMENTS

| | | |
|---|---|---|
| 354,010 A | 12/1886 | Black |
| 1,833,764 A | 1/1931 | Tremblay et al. |
| 1,879,917 A | 9/1932 | Evans |
| 2,127,044 A | 8/1938 | Mutchler, Sr. |
| 2,295,609 A | 9/1942 | Shimon |
| 2,363,256 A | 11/1944 | Manning et al. |
| 2,611,495 A | 9/1952 | Weaver |
| 2,620,748 A | 12/1952 | Shields |
| 2,766,660 A | 10/1956 | Laddon et al. |
| 2,773,564 A | 12/1956 | Garard |
| D180,922 S | 9/1957 | Zikmund et al. |

(Continued)

FOREIGN PATENT DOCUMENTS

| | | |
|---|---|---|
| DE | 3245951 | 6/1984 |
| EP | 0863061 | 9/1998 |

(Continued)

OTHER PUBLICATIONS

Down River; Roll Paper Cargo Securement System, G-Force Load Securement Innovations; Brochure, Copyright 2014, US.

(Continued)

*Primary Examiner* — Stephen T Gordon (57) ABSTRACT

A releasable paperboard chock assembly is provided comprising first and second paperboard chocks, each comprising a base, a back wall, and first and second side walls adjacent to the base. Each of the first and second side walls comprises an upper edge surface having a generally curved portion to conform to a curved surface of a roll to be secured. A paperboard sling extends between the first and second chocks comprising first and second ends joined to the first and second chocks, respectively.

19 Claims, 10 Drawing Sheets

(56) References Cited

U.S. PATENT DOCUMENTS

| | | | |
|---|---|---|---|
| D181,031 S | 9/1957 | Wilson et al. | |
| 2,849,027 A | 8/1958 | Tetyak | |
| 3,004,742 A | 10/1961 | Davidson | |
| 3,091,348 A | 5/1963 | Neuhauser | |
| D200,967 S | 4/1965 | King | |
| 3,197,236 A | 7/1965 | Burton | |
| 3,229,825 A | 1/1966 | Brown, Jr. | |
| 3,871,492 A | 3/1975 | Garrett et al. | |
| 3,973,651 A | 8/1976 | Garrett et al. | |
| 4,102,274 A | 7/1978 | Feary et al. | |
| 4,195,732 A | 4/1980 | Bell | |
| 4,305,508 A | 12/1981 | Rodgers | |
| 4,310,271 A * | 1/1982 | Canellis | B60P 3/07 |
| | | | 410/23 |
| 4,371,298 A * | 2/1983 | Van Iperen | B60P 3/073 |
| | | | 410/23 |
| 4,382,733 A | 5/1983 | Rodgers | |
| 4,476,961 A | 10/1984 | Luigi | |
| 4,572,716 A | 2/1986 | West | |
| 4,582,176 A | 4/1986 | Roberts | |
| 4,804,070 A | 2/1989 | Bohler | |
| 4,832,196 A | 5/1989 | Butler | |
| D308,341 S | 6/1990 | Winterling | |
| D309,107 S | 7/1990 | Winterling | |
| D315,712 S | 3/1991 | Norato | |
| 5,193,700 A | 3/1993 | Lyman et al. | |
| 5,425,608 A | 6/1995 | Reitnouer | |
| 5,484,241 A * | 1/1996 | Haywood | B61D 45/008 |
| | | | 410/154 |
| 5,515,977 A | 5/1996 | Lambert | |
| 5,647,708 A * | 7/1997 | Letts, III | B60P 7/16 |
| | | | 410/47 |
| 5,741,098 A | 4/1998 | Letts, III | |
| 5,743,689 A * | 4/1998 | Schlaeger | B60P 3/077 |
| | | | 410/30 |
| 5,927,443 A | 7/1999 | Collins, Jr. | |
| 5,934,467 A | 8/1999 | Gilfert et al. | |
| 5,954,465 A * | 9/1999 | Ellerbush | B60P 7/12 |
| | | | 410/47 |
| 6,170,789 B1 | 1/2001 | Hayakawa | |
| 6,290,029 B1 | 9/2001 | Gubler et al. | |
| RE37,575 E | 3/2002 | Lambert | |
| 6,357,987 B1 | 3/2002 | Palus | |
| 6,550,741 B1 | 4/2003 | Cottone | |
| 7,036,637 B1 | 5/2006 | Wiens | |
| 7,264,092 B2 | 9/2007 | Jette | |
| 7,331,505 B2 | 2/2008 | Holley, Jr. | |
| 7,367,453 B2 | 5/2008 | Sutherland | |
| 8,047,751 B2 | 11/2011 | Powers et al. | |
| 8,118,180 B2 | 2/2012 | Jonschker et al. | |
| D656,881 S | 4/2012 | Beranek et al. | |
| D656,882 S | 4/2012 | Beranek et al. | |
| D662,026 S | 6/2012 | Beranek et al. | |
| 8,308,409 B2 | 11/2012 | Anderson | |
| 8,475,095 B2 | 7/2013 | Quick et al. | |
| 8,491,239 B2 * | 7/2013 | Ferrari | B60P 3/035 |
| | | | 410/94 |
| 8,646,244 B2 | 2/2014 | Ludwig et al. | |
| 8,696,272 B1 | 4/2014 | Ragland | |
| 9,376,236 B2 | 6/2016 | Langh-Lagerlof | |
| 9,394,150 B2 | 7/2016 | Bow et al. | |
| 9,440,771 B2 | 9/2016 | Pratt | |
| D772,775 S | 11/2016 | Bird et al. | |
| 9,739,397 B2 | 8/2017 | Pratt | |
| D830,280 S | 10/2018 | Erickson | |
| D838,595 S | 1/2019 | Frodsham | |
| 2006/0113215 A1 | 6/2006 | Clements et al. | |
| 2011/0318131 A1 * | 12/2011 | Quick | B60P 7/12 |
| | | | 410/47 |
| 2012/0269595 A1 | 10/2012 | Fox | |
| 2013/0078048 A1 * | 3/2013 | Strang | B60P 7/12 |
| | | | 410/49 |
| 2014/0234048 A1 * | 8/2014 | Adams | B60P 7/12 |
| | | | 410/121 |

FOREIGN PATENT DOCUMENTS

| | | |
|---|---|---|
| GB | 1356736 A | 6/1974 |
| NL | 1036370 | 1/2010 |
| WO | WO-2014/129940 | 8/2014 |

OTHER PUBLICATIONS

Eredi Caimi, s.r.l.; Molded pulp cradle; Catalogue, http://www.directindustry.com/prod/eredi-caimi/product-15940-1624822.html.

* cited by examiner

RELEASABLE PAPERBOARD CHOCK ASSEMBLY

FIELD OF THE INVENTION

The present invention relates to a releasable paperboard chock assembly.

BACKGROUND OF THE INVENTION

It is known to secure large rolls of paper on a pallet by placing small diameter cylindrical rolls on opposing lower side surfaces of the large rolls of paper such that the small diameter cylindrical rolls function as chocks. Bands are passed through a centrally located core within each large roll of paper as well as sections of the pallet to further secure the rolls to the pallet. The two small diameter cylindrical rolls are not connected to one another and can move independently of one another.

SUMMARY OF THE INVENTION

In accordance with a first aspect of the present invention, a releasable paperboard chock is provided. The paperboard chock is formed from a blank that may comprise a first section, a second section connected to the first section and a third section connected to the second section. The first section may include a bottom panel and first and second outer side panels. The second section may comprise a back panel and the third section may comprise first and second inner side panels. The releasable paperboard chock may comprise a base defined by the bottom panel; a back wall defined by the back panel; and first and second side walls adjacent to the base and defined by the first and second outer side panels and the first and second inner side panels. Each of the first and second inner and outer side panels may comprise an upper edge surface having at least a portion that is generally curved so as to conform to a curved surface of a roll to be secured.

The curved portion of the upper edge surface of each of the first and second inner and outer side panels may define an arc having an angle of from about 30 degrees to about 60 degrees.

The third section of the blank may further comprise first and second intermediate side panels connected respectively to the first and second inner side panels. The first and second side walls may be further defined by the first and second intermediate side panels, such that the first intermediate side panel may be located between the first outer and inner side panels and the second intermediate side panel may be located between the second outer and inner side panels.

The first section of the blank may further comprise first and second intermediate rear panels connected respectively to the first and second outer side panels via score lines. The releasable paperboard chock may further comprise an intermediate rear wall positioned adjacent to the back wall and may be defined by the first and second intermediate rear panels.

The first section of the blank may further comprise first and second handle sections connected respectively to the first and second intermediate rear panels by score lines. The back wall may comprise a slot through which the first and second handle sections extend so as to form a chock handle.

The first section of the blank may further comprise first and second lower traversing panels connected respectively to the first and second intermediate rear panels via score lines. The releasable paperboard chock may further comprise a lower traversing wall extending above and across a portion of the base and be defined by the first and second lower traversing panels.

The second section of the blank may further comprise an outer traversing panel connected to the back panel via a score line. The releasable paperboard chock may further comprise an upper traversing wall extending over the lower traversing wall and be defined by the outer traversing panel.

The upper edge surface of each of the first and second outer side panels may comprise a further portion which defines a notch with the generally curved portion. The lower and upper traversing walls may extend into the notch such that an outer surface of the upper traversing wall is generally even with the generally curved portions of the upper edge surfaces of the first and second outer side panels.

The third section of the blank may further comprise a connecting panel joined to the outer traversing panel via a score line and may also be joined to the first and second inner side panels via score lines. The releasable paperboard chock may further comprise a connecting wall joined to the first and second inner side panels and be defined by the connecting panel.

In accordance with a further aspect of the present invention, a paperboard blank is provided for use in forming a releasable paperboard chock. The paperboard blank may comprise a first section, a second section and a third section. The first section may comprise a bottom panel and first and second outer side panels connected respectively to the bottom panel via score or fold lines. An outer edge surface of each of the first and second outer side panels may comprise a generally curved portion. The second section may comprise a back panel connected to the bottom panel by a score line. The third section may be connected to the second section and comprise first and second inner side panels. An outer edge surface of each of the first and second inner side panels may comprise a generally curved portion.

The third section of the blank may further comprise first and second intermediate side panels connected respectively to the first and second inner side panels via score lines. An outer edge surface of each of the first and second intermediate side panels may comprise a generally curved portion.

The first section of the blank may further comprise first and second intermediate rear panels connected respectively to the first and second outer side panels via score lines.

The first section of the blank may further comprise first and second handle sections connected respectively to the first and second intermediate rear panels by score lines. The back panel may comprise a slot.

The first section of the blank may further comprise first and second lower traversing panels connected respectively to the first and second intermediate rear panels via score lines.

The second section of the blank may further comprise an outer traversing panel connected to the back panel via a score line.

The third section of the blank may further comprise a connecting panel joined to the outer traversing panel via a score line and may also be joined to the first and second inner panels via score lines.

The outer edge surface of each of the first and second outer side panels may comprise a further portion which defines a notch with the generally curved portion.

The blank may comprise a dual layer paperboard blank.

The curved portion of the outer edge surface of each of the first and second outer side panels may comprise a radius of curvature of from about 20 inches to about 30 inches.

In accordance with a third aspect of the present invention, a releasable paperboard chock assembly is provided comprising first and second paperboard chocks and a sling extending between the first and second chocks. The first paperboard chock may comprise a first base, a first back wall, and first and second side walls adjacent to the base. Each of the first and second side walls may comprise an upper edge surface. The first back wall may comprise a lower edge located near a support surface and an upper edge opposed to the lower edge. The second paperboard chock may comprise a second base, a second back wall, and third and fourth side walls adjacent to the base. Each of the third and fourth side walls may comprise an upper edge surface.

The first and second chocks may be positioned such that the upper edge surfaces of the first and second side walls of the first chock are facing towards the upper edge surfaces of the third and fourth side walls of the second chock.

The paperboard sling may comprise first and second outer ends joined to the first and second chocks, respectively. The sling first end may be joined to the first chock only at the first back wall of the first chock. A roll may be positioned on the chock assembly such that the roll is located on the sling with the first and second chocks at least partially located under the sling and the roll to secure the roll in position. The first chock can be removed to release the roll after separating a section of the sling from the first chock.

The paperboard sling may have a generally rectangular shape with a plurality of score lines extending transversely to a longitudinal length of the sling so as to allow the sling to conform to the shape of the upper edge surfaces of the first and second side walls of the first chock and the third and fourth side walls of the second chock.

The first chock may further comprise a first handle extending through a slot in the first back wall of the first chock.

The first outer end of the sling may comprise an opening and the sling first outer end may be positioned over the first back wall of the first chock with the first handle extending through the opening in the sling first end.

The sling first outer end may be joined to the first chock only at the first back wall of the first chock at one or more first securement locations on the first back wall between the lower and upper edges of the first back wall.

The sling first outer end may be joined to the first chock via adhesive at the one or more first securement locations on the first back wall of the first chock.

The sling first outer end may further comprise tear tape located between the first securement location and the upper edge of the first back wall. The tear tape allows the sling section to be separated from the first chock such that the first chock can be removed.

The sling first outer end may further comprise an area located between the first securement location and the upper edge of the first back wall which can be severed to allow the sling section to be separated from the first chock such that the first chock can be removed.

The second back wall comprises a lower edge located near the support surface and an upper edge opposed to the lower edge. The sling second end may be joined to the second chock only at the second back wall of the second chock. The second chock may be removed after separating the section of the sling from the second chock.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
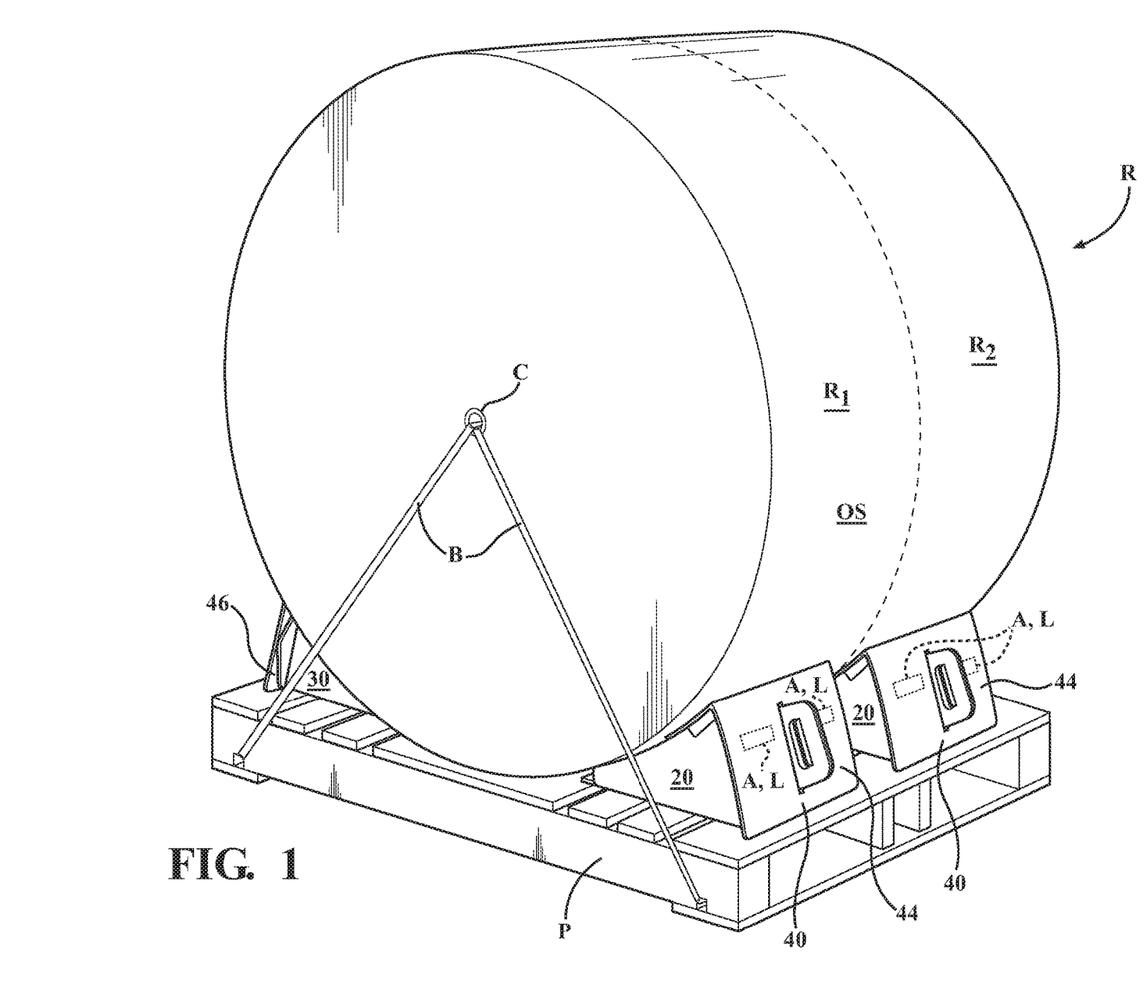
FIG. 1 is a perspective view of a roll positioned on a pair of releasable paperboard chock assemblies, constructed in accordance with the present invention, positioned side-by-side and located on a pallet.
Figure 2:
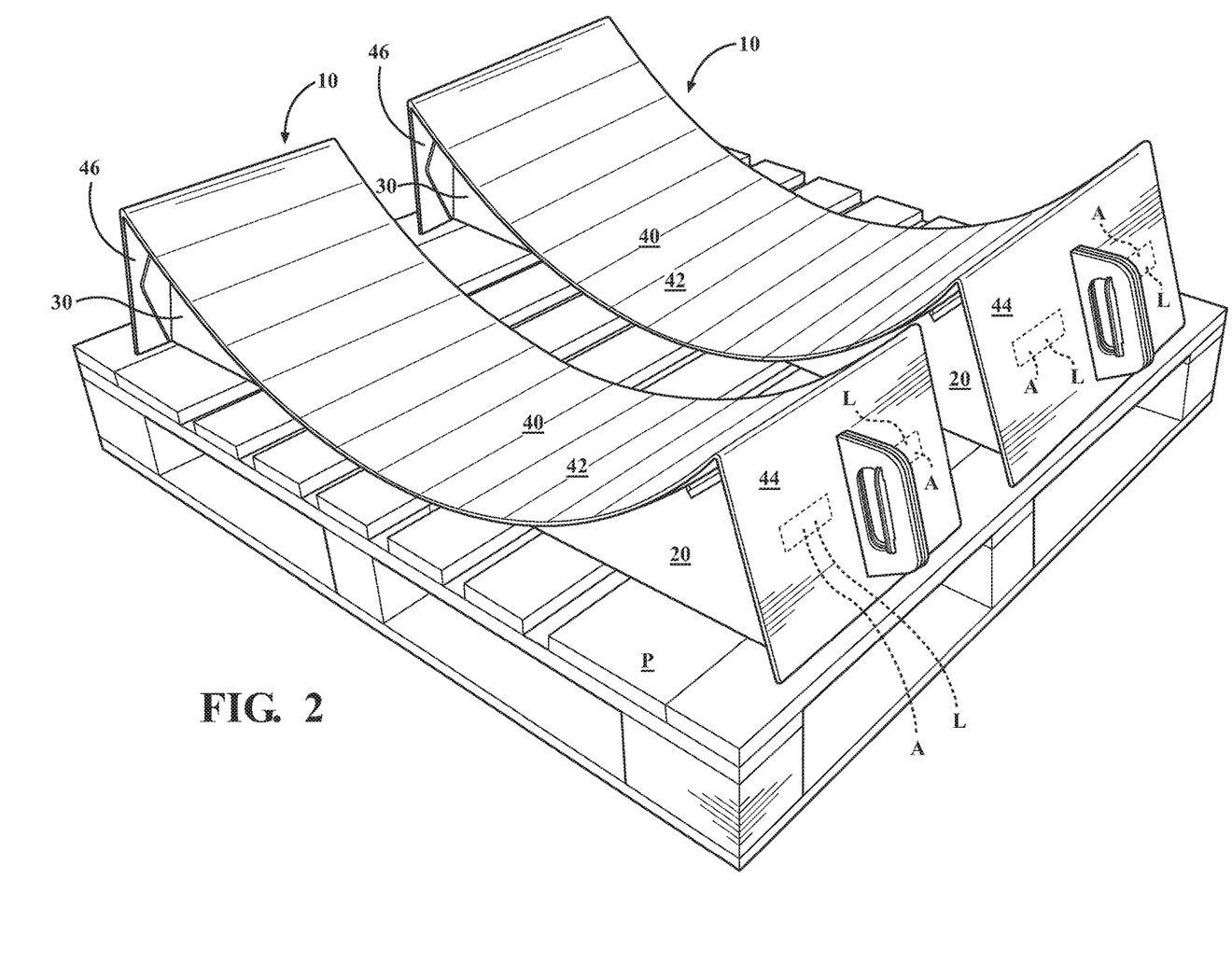
FIG. 2 is a perspective view of a pair of releasable paperboard chock assemblies, constructed in accordance with the present invention, positioned side-by-side and located on a pallet.

Referring to FIGS. 1 and 2, a pair of releasable paperboard chock assemblies 10 constructed in accordance with the present invention are illustrated positioned adjacent to one another on a pallet P. Each chock assembly 10 is constructed in the same manner such that only one chock assembly 10 will be described herein.

The releasable paperboard chock assembly 10 may comprise first and second releasable paperboard chocks 20 and 30 and a paperboard sling 40 extending between the first and second chocks 20 and 30, see FIGS. 1 and 2. Each of the first and second chocks 20 and 30 may be constructed in the same manner. Hence, only a description of the first chock 20 will be fully described herein.

Figure 3:
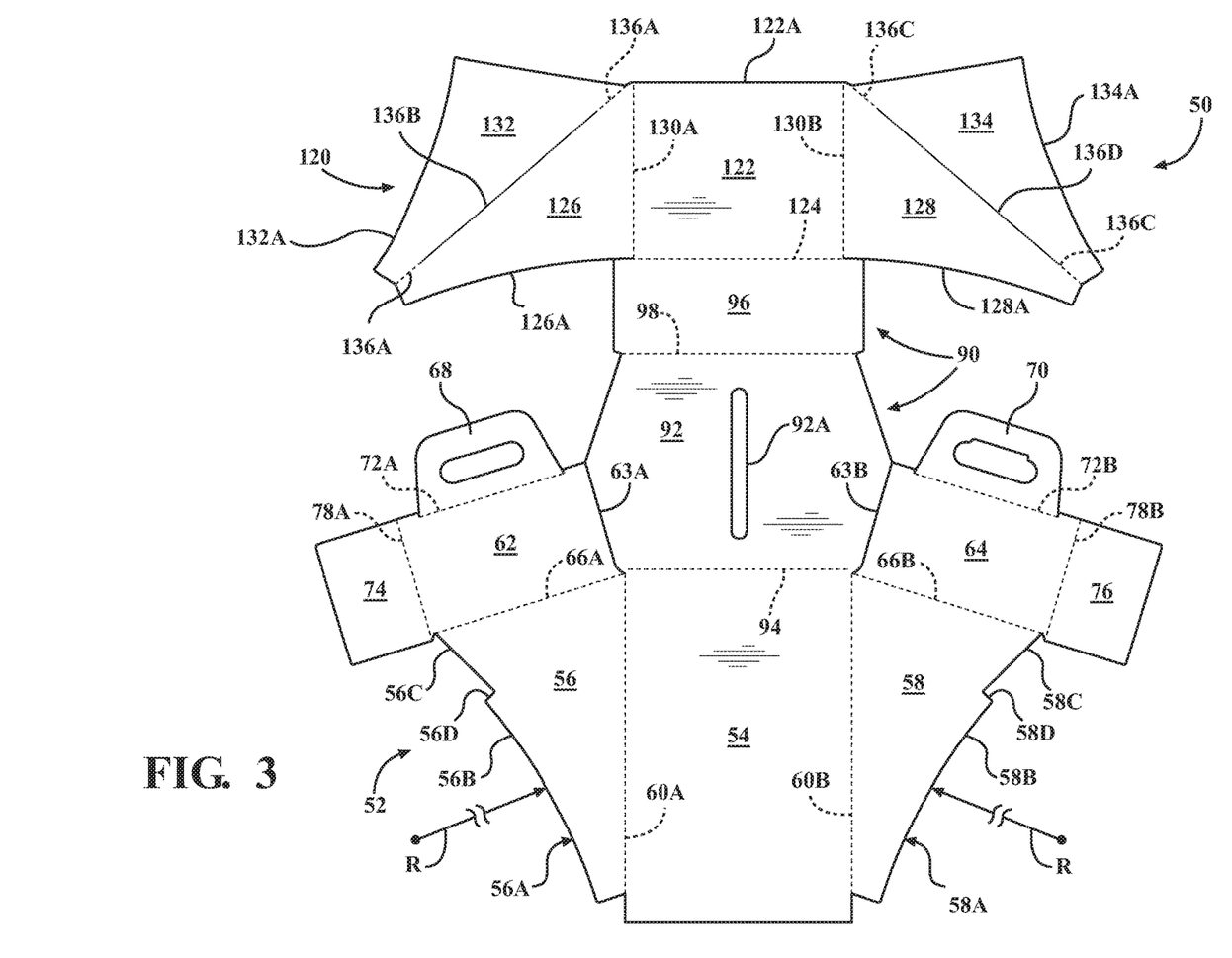
FIG. 3 illustrates a paperboard blank from which a paperboard chock constructed in accordance with the present invention is formed.

The first chock 20 may be formed from a paperboard blank 50, see FIG. 3. In the illustrated embodiment, the paperboard blank 50 is formed from a double-wall, or dual layer, corrugated paperboard. However, a single wall corrugated paperboard or a solid fiber paperboard may also be used as well as any other flat material capable of being cut and folded easily, including a polymeric material.

The paperboard blank 50 comprises a first section 52, a second section 90 and a third section 120, see FIG. 3. The first section 52 comprises a bottom panel 54 and first and second outer side panels 56 and 58, respectively. The first and second outer side panels 56 and 58 are connected respectively to the bottom panel 54 via score lines 60A and 60B. A first outer edge surface 56A of the first outer side panel 56 comprises a generally curved portion 56B and a generally planar or straight portion 56C, wherein a notch 56D is defined by the curved and straight portions 56B and 56C of the first outer edge surface 56A. A second outer edge surface 58A of the second outer side panel 58 comprises a generally curved portion 58B and a generally planar or straight portion 58C, wherein a notch 58D is defined by the curved and straight portions 58B and 58C of the second outer edge surface 58A. The curved portions 56B and 58B of the first and second outer edge surfaces 56A and 58A of the first and second outer side panels 56 and 58 may comprise a radius of curvature R of from about 20 inches to about 30 inches, see FIG. 3, but other radii of curvature could be used depending upon the diameter of the roll to be secured.

The first section 52 of the blank 50 further comprises first and second intermediate rear panels 62 and 64 connected respectively to the first and second outer side panels 56 and 58 via score lines 66A and 66B. The first section 52 of the blank 50 also comprises first and second handle sections 68 and 70 connected respectively to the first and second intermediate rear panels 62 and 64 by score lines 72A and 72B. The first section 52 of the blank 50 still further comprises first and second lower traversing panels 74 and 76 connected respectively to the first and second intermediate rear panels 62 and 64 via score lines 78A and 78B.

The second section 90 of the paperboard blank 50 comprises a back panel 92 connected to the bottom panel 54 via a score line 94. The back panel 92 may include a handle slot 92A, see FIG. 3. The second section 90 of the blank 50 may further comprise an outer traversing panel 96 connected to the back panel 92 via a score line 98. The first and second intermediate rear panels 62 and 64 are located directly adjacent to the back panel 92 but are severed/separated from the back panel 92 via cut lines 63A and 63B, wherein the cut lines 63A, 63B extend completely through the thickness of the blank 50.

The third section 120 of the paperboard blank 50 comprising a connecting panel 122 joined to the outer traversing panel 96 via a score line 124. The third section 120 of the blank 50 further comprises first and second inner side panels 126 and 128 connected to the connecting panel 122 via score lines 130A and 130B, respectively, see FIG. 3. The third section 120 of the blank 50 still further comprises in the illustrated embodiment first and second intermediate side panels 132 and 134 connected respectively to the first and second inner side panels 126 and 128. The first intermediate side panel 132 is connected to the first inner side panel 126 via sections of score lines 136A located on opposite ends of a centrally located cut line 136B, wherein the cut line 136B extends completely through the thickness of the blank. A score line could extend along the entire interface between the first inner side panel 126 and the first intermediate side panel 132. The second intermediate side panel 134 is connected to the second inner side panel 128 via sections of score lines 136C located on opposite ends of a centrally located cut line 136D. A score line could extend along the entire interface between the second inner side panel 128 and the second intermediate side panel 134. It is also contemplated that the first and second intermediate side panels 132 and 134 could be omitted.

The first and second inner panels 126 and 128 and the first and second intermediate side panels 132 and 134 respectively comprise a curved outer edge surface 126A, 128A, 132A and 134A, wherein each curved outer edge surface 126A, 128A, 132A and 134A may have a radius of curvature that is substantially equal to the radius of curvature R of the curved portions 56B and 58B of the first and second outer edge surfaces 56A and 58A of the first and second outer side panels 56 and 58.

In the illustrated embodiment, the first releasable paperboard chock 20 is formed using the paperboard blank 50. The paperboard chock 20 comprises a base 100 defined by the bottom panel 54 of the blank 50, a back wall 102 defined by the back panel 92 of the blank 50 and first and second side walls 104 and 106, see FIGS. 8 and 9. The first side wall 104 is defined by the first outer side panel 56, the first intermediate side panel 132 and the first inner side panel 126 of the blank 50, see FIGS. 7, 8 and 9. In the illustrated embodiment, during assembly of the chock 20, the first outer side panel 56, the first intermediate side panel 132 and the first inner side panel 126 are not joined to one another. However, it is contemplated that the first outer side panel 56, the first intermediate side panel 132 and the first inner side panel 126 may be adhesively or mechanically joined together such as by staples, tape or the like to improve strength.

The second side wall 106 is defined by the second outer side panel 58, the second intermediate side panel 134 and the second inner side panel 128. In the illustrated embodiment, during assembly of the chock 20, the second outer side panel 58, the second intermediate side panel 134 and the second inner side panel 128 are not joined to one another. However, it is contemplated that the second outer side panel 58, the second intermediate side panel 134 and the second inner side panel 128 may be adhesively or mechanically joined together such as by staples, tape and the like to improve strength.

The first side wall 104 comprises a first upper edge surface 204 having a curved portion 204A conforming to the shape of the outer surface OS of a roll R to be secured by the releasable paperboard chock assembly 10, see FIG. 1. The curved portion 204A of the first upper edge surface 204 of the first wall 104 is defined by the curved portion 56B of the first outer edge surface 56A of the first outer side panel 56, the curved outer edge surface 132A of the first intermediate side panel 132 and the curved outer edge surface 126A of the first inner side panel 126. The second side wall 106 comprises a second upper edge surface 206 having a curved portion 206A conforming to the shape of the outer surface OS of the roll R to be secured by the releasable paperboard chock assembly 10. The curved portion 206A of the second upper edge surface 206 of the second side wall 106 is defined by the curved portion 58B of the second outer edge surface 58A of the second outer side panel 58, the curved outer edge surface 134A of the second intermediate side panel 134 and the curved outer edge surface 128A of the first inner side panel 128. Each of the curved portion 204A of the first upper edge surface 204 of the first wall 104 and the curved portion 206A of the second upper edge surface 206 of the second side wall 106 may define an arc A of from about 30 degrees to about 60 degrees, see FIG. 8.

Figure 5:
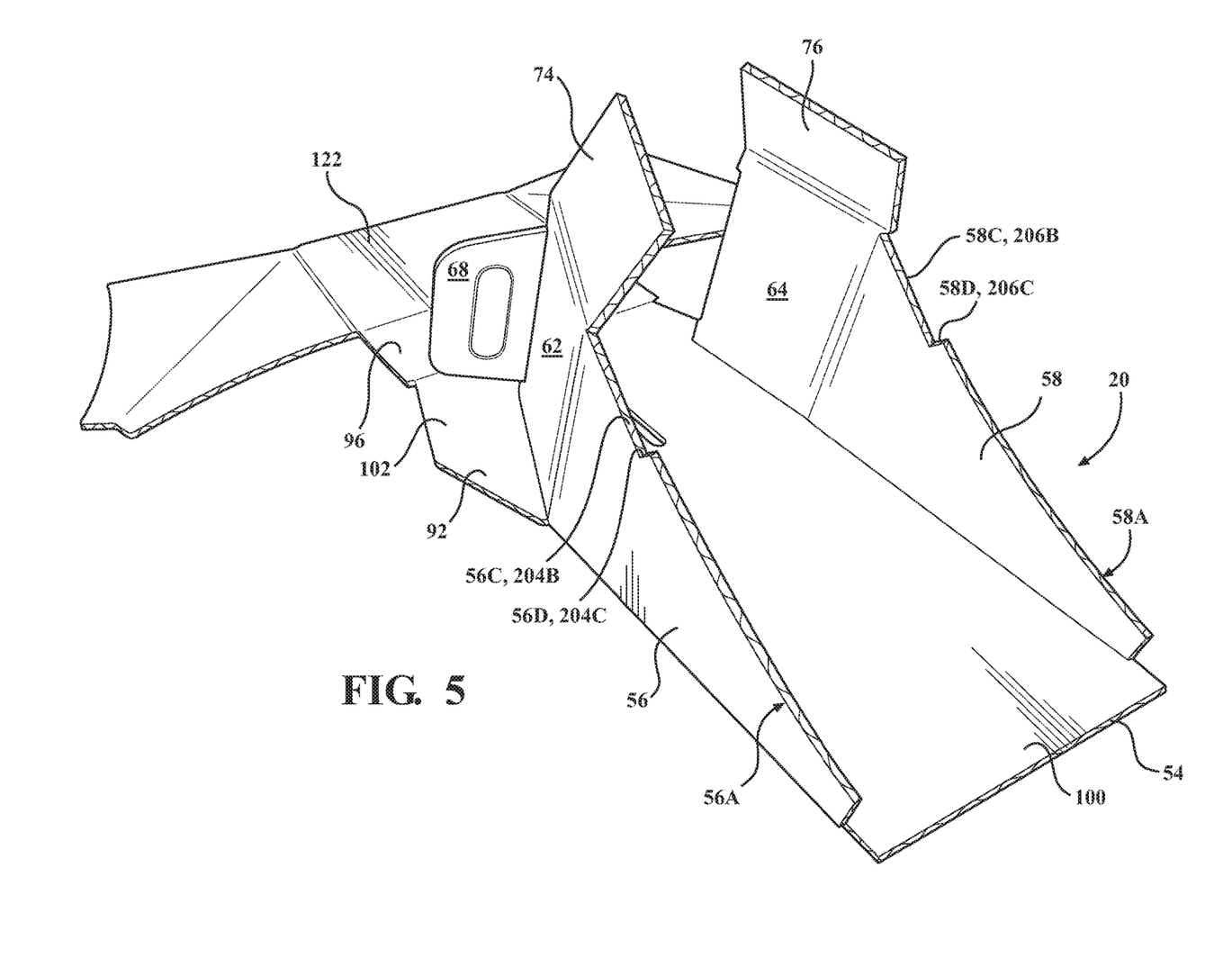
FIGS. 5-7 illustrate folding steps taken to create a paperboard chock from the blank of FIG. 3.

The first upper edge surface 204 of the first side wall 104 further comprises a generally straight or planar portion 204B defined by the straight portion 56C of the first outer edge surface 56A of the first outer side panel 56, see FIG. 5. The first upper edge surface 204 of the first side wall 104 still further comprises a first notch 204C, which is defined by the notch 56D of the first outer edge surface 56A of the first outer side panel 56. The first notch 204C is further defined by the curved and straight portions 204A and 204B of the first upper edge surface 204 of the first side wall 104. The second upper edge surface 206 of the second side wall 106 further comprises a generally straight or planar portion 206B defined by the straight portion 58C of the second outer edge surface 58A of the second outer side panel 58, see FIG. 5. The second upper edge surface 206 of the second side wall 106 still further comprises a second notch 206C, which is defined by the notch 58D of the second outer edge surface 58A of the second outer side panel 58. The second notch 206C is further defined by the curved and straight portions 206A and 206B of the second upper edge surface 206 of the second side wall 106.

Figure 6:
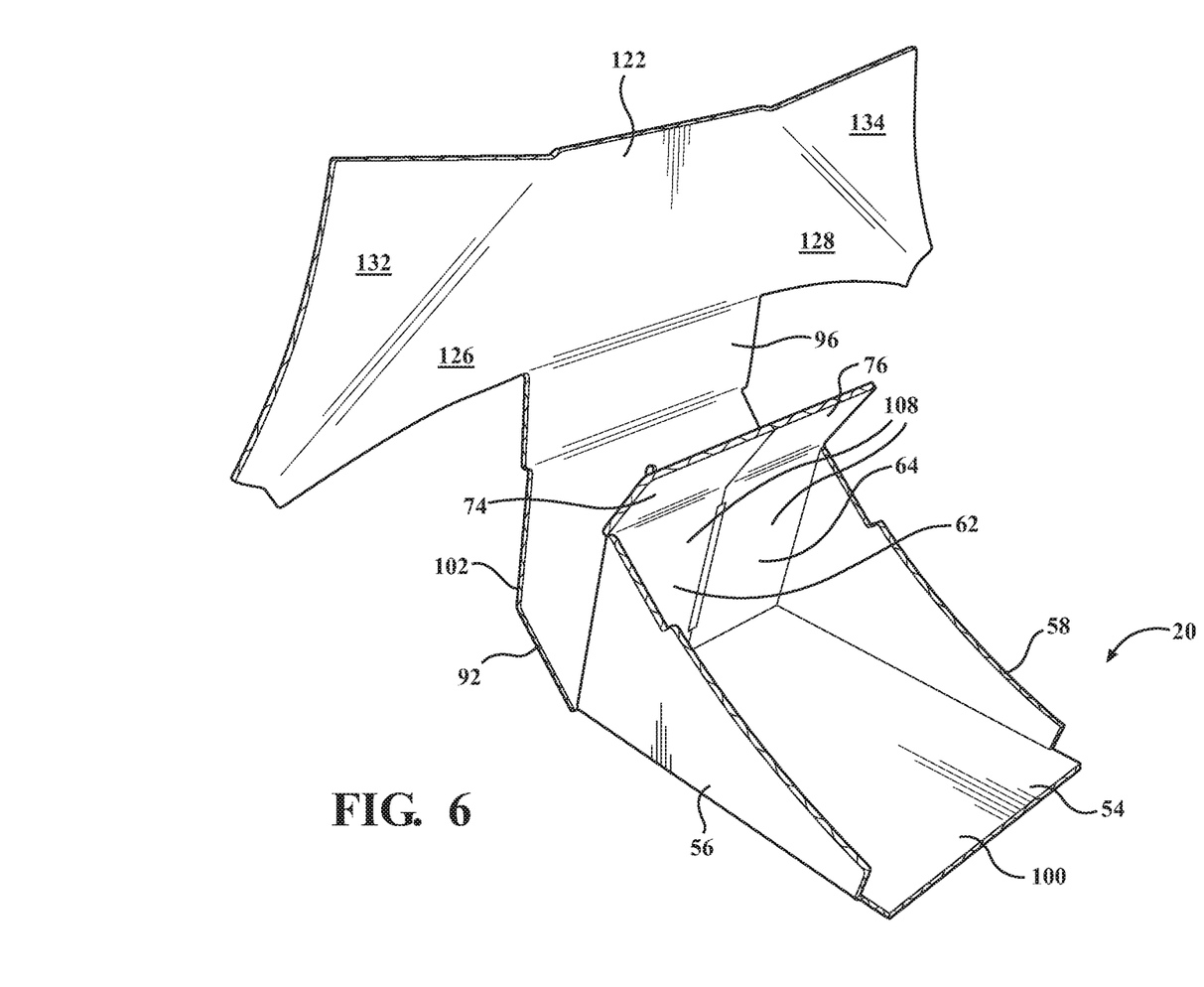

The paperboard chock 20 further comprises an intermediate rear wall 108 positioned adjacent to the back wall 102 and defined by the first and second intermediate rear panels 62 and 64, which panels 62 and 64 are positioned adjacent to one another once the chock 20 has been assembled, see FIG. 6. In the illustrated embodiment, the first and second intermediate rear panels 62 and 64 are not joined to one another. However, it is contemplated that the first and second intermediate rear panels 62 and 64 could be joined together, such as by tape, staples or the like.

Figure 9:
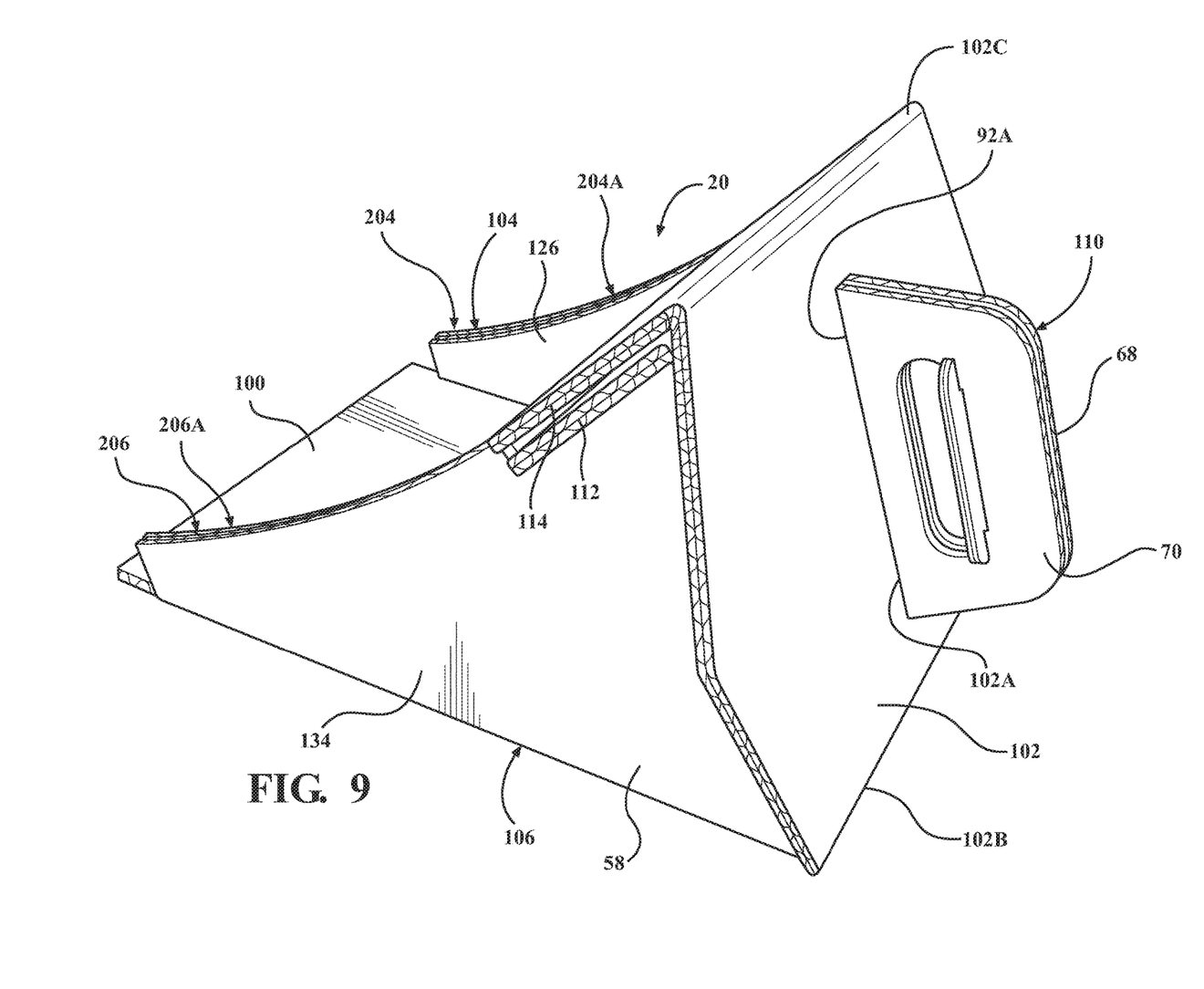

In the illustrated embodiment, the paperboard chock 20 still further comprises a handle 110 defined by the first and second handle sections 68 and 70, which handle sections 68 and 70 are positioned adjacent to another and extend through a slot 102A in the back wall 102 once the chock 20 has been assembled, see FIG. 9. The slot 102A in the back wall 102 is defined by the slot 92A in the back panel 92. In the illustrated embodiment, the first and second handle sections 68 and 70 are not joined to one another. However, it is contemplated that the first and second handle sections 68 and 70 could be joined together, such as by tape, staples or the like.

The paperboard chock 20 also comprises a lower traversing wall 112 extending above and across a portion of the base 100, see FIGS. 6, 7, 8 and 9. Once the chock 20 has been assembled, the first and second lower traversing panels 74 and 76 are positioned adjacent to one another such that they define the lower traversing wall 112. In the illustrated embodiment, the first and second lower traversing panels 74 and 76 are not joined to one another. However, it is contemplated that the first and second lower traversing panels 74 and 76 could be joined together, such as by tape, staples or the like.

The paperboard chock 20 further comprises an upper traversing wall 114 extending over the lower traversing wall 112 and defined by the outer traversing panel 96.

Once the paperboard chock 20 is assembled, the lower traversing wall 112 and the upper traversing wall 114 are received in the notches 204C and 206C of the first and second upper edge surfaces 204 and 206 of the first and second side walls 104 and 106 and are supported by the generally straight portions 204B and 206B of the first and second upper edge surfaces 204 and 206 of the first and second side walls 104 and 106. In the illustrated embodiment, once the chock 20 has been assembled, an outer surface 114A of the upper traversing wall 114 is generally even with the generally curved portions 204A and 206A of the first and second upper edge surfaces 204 and 206 of the first and second side walls 104 and 106, see FIG. 8.

Figure 7:
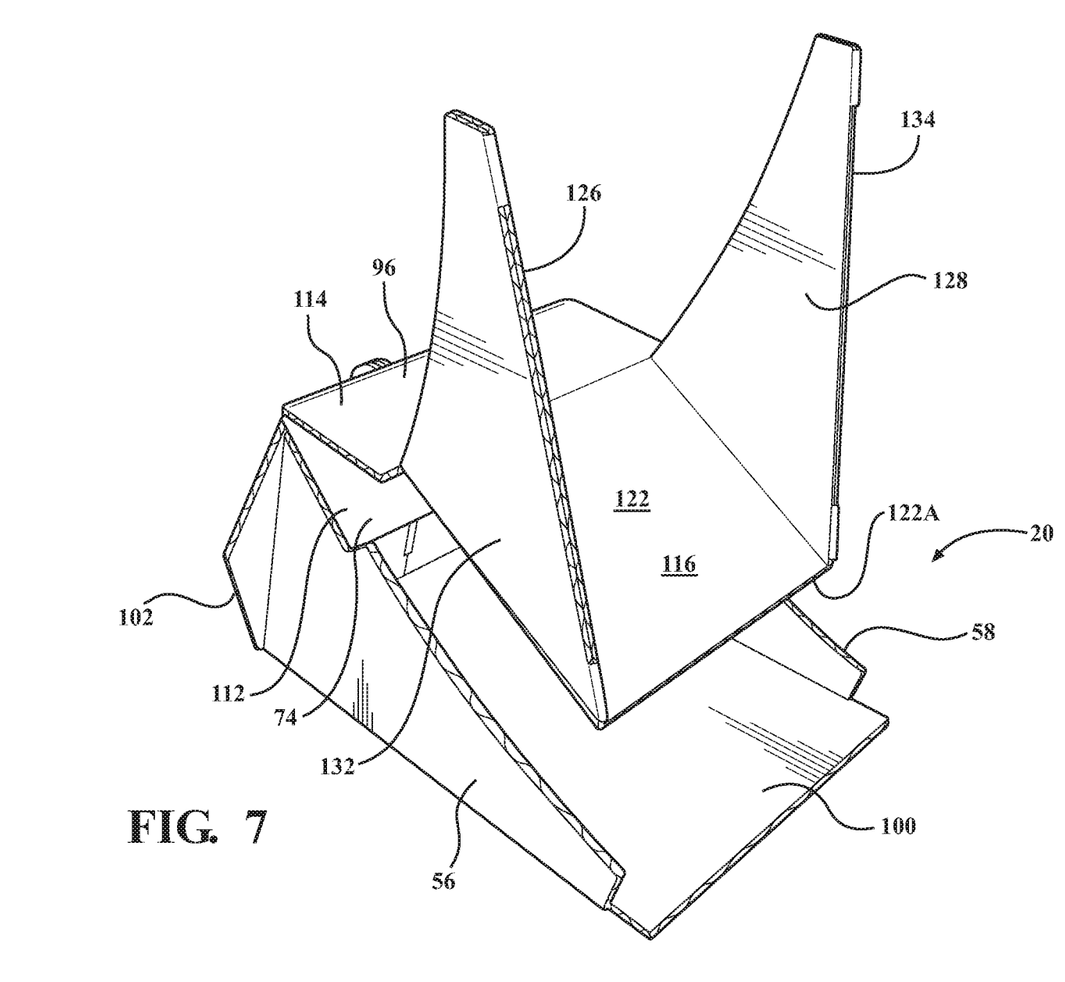
Figure 8:
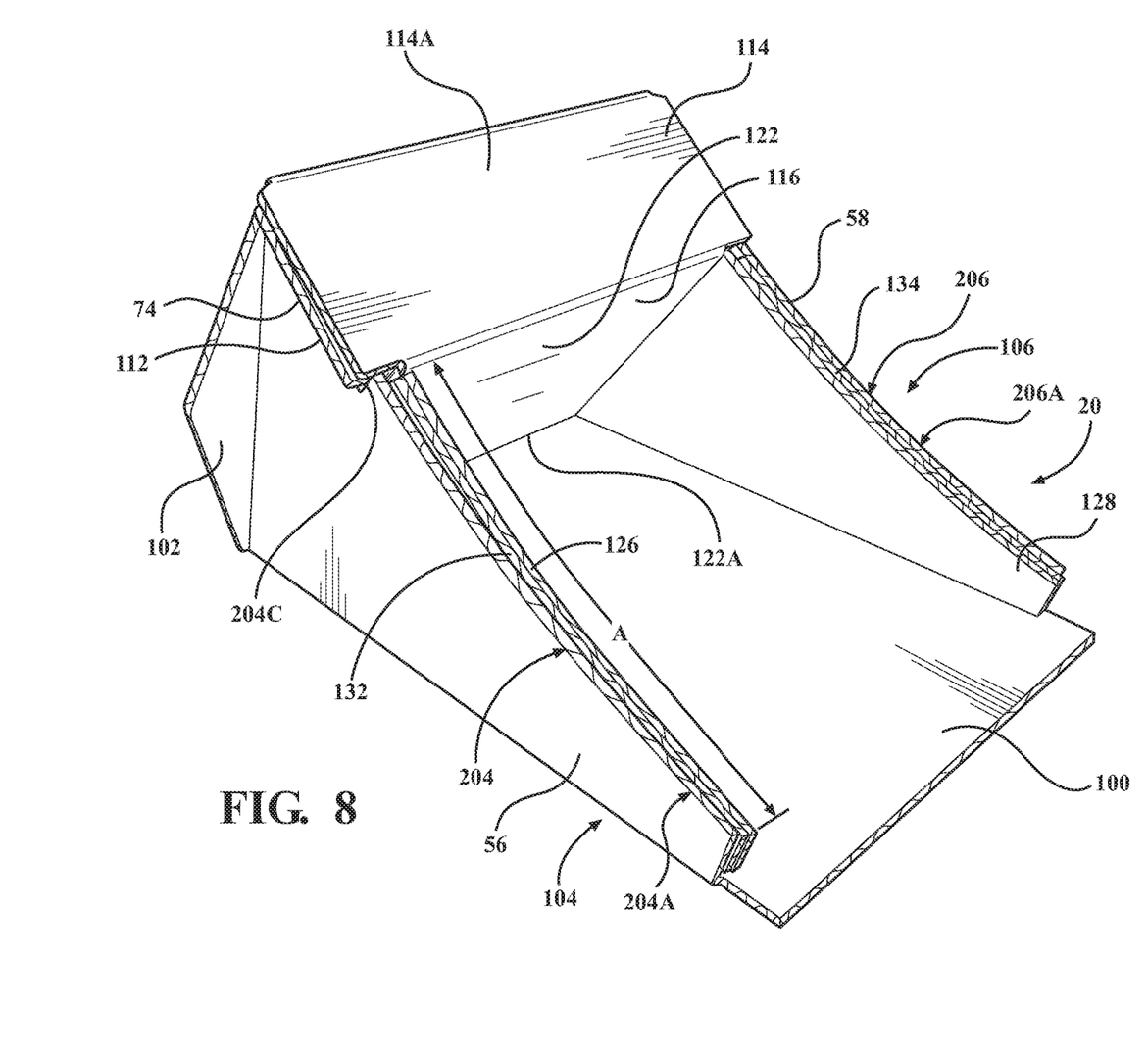
FIGS. 8 and 9 are perspective views taken at different angles of a chock constructed in accordance with the present invention.

The paperboard chock 20 still further comprises a connecting wall 116 joined to the first and second inner side panels 126 and 128 and is defined by the connecting panel 122, see FIGS. 7 and 8.

Assembly of the chock 20 using the paperboard blank 50 will now be described with reference to FIGS. 3 and 5-9. The paperboard blank 50 is initially in a flat or planar form as viewed in FIG. 3. The first and second outer side panels 56 and 58 are then folded upward approximately 90 degrees along the score lines 60A and 60B, see FIG. 5. The first and second intermediate rear panels 62 and 64 are then folded inwardly approximately 90 degrees about score lines 66A and 66B such that they are adjacent to one another to define the intermediate rear wall 108 of the chock 20, see FIGS. 5 and 6. The first and second handle sections 68 and 70 are folded about score lines 72A, 72B such that the handle sections 68, 70 are positioned adjacent to another, see FIG. 9.

The second and third sections 90 and 120 are then folded upwardly approximately 90 degrees relative to the base 100, i.e., the back panel 92 is folded about the score line 94, see FIG. 6. As the back panel 92 is folded about the score line 94, the adjacent first and second handle sections 68 and 70 are extended through the slot 92A in the back panel 92.

The first and second lower traversing panels 74 and 76 are folded approximately 90 degrees about score lines 78A and 78B toward the base 100 to form the lower traversing wall 112 extending above and across a portion of the base 100, see FIGS. 6-9. The first and second traversing panels 74 and 76 are folded about the score lines 78A and 78B such that they are positioned within the notches 204C and 206C of the first and second upper edge surfaces 204 and 206 of the first and second side walls 104 and 106 and supported by the generally straight portions 204B and 206B of the first and second upper edge surfaces 204 and 206 of the first and second side walls 104 and 106 to define the lower traversing wall 112, see FIG. 7.

The first intermediate and inner side panels 132 and 126 are folded together about the score lines 136A and the cut line 136B so that the curved outer edge surfaces 132A and 126A of the first intermediate and inner side panels 132 and 126 are adjacent to and aligned with one another, see FIG. 7. In a similar manner, the second intermediate and inner side panels 134 and 128 are folded together about the score lines 136C and the cut line 136D so that the curved outer edge surfaces 134A and 128A of the second intermediate and inner side panels 134 and 128 are adjacent to and aligned with one another, see FIG. 7. In the illustrated embodiment, the first intermediate and inner side panels 132 and 126 are folded such that the first intermediate panel 132 is positioned adjacent to the first outer side panel 56, see FIGS. 7 and 8. However, it is also contemplated that the first intermediate and inner side panels 132 and 126 may be folded in an opposite manner such that the first inner side panel 126 is positioned adjacent to the first outer side panel 56. Also, in the illustrated embodiment, the second intermediate and inner side panels 134 and 128 are folded such that the second intermediate panel 134 is positioned adjacent to the second outer side panel 58, see FIGS. 7 and 8. However, it is also contemplated that the second intermediate and inner side panels 134 and 128 may be folded in an opposite manner such that the second inner side panel 128 is positioned adjacent to the second outer side panel 58.

The outer traversing panel 96 is then folded about the score line 98 and positioned over the lower traversing wall 112 to form the upper traversing wall 114, see FIGS. 7 and 8. The upper traversing wall 114 is also positioned within the notches 204C and 206C of the first and second upper edge surfaces 204 and 206 of the first and second side walls 104 and 106 and supported by the lower traversing wall 112.

The connecting panel 122 along with the adjacent first intermediate and inner side panels 132 and 126 and the adjacent second intermediate and inner side panels 134 and 128 are folded and rotated about score line 124 until an end edge 122A of the connecting panel 122 engages or is adjacent to the intermediate rear wall 108, see FIGS. 7 and 8. The connecting panel 122 defines the connecting wall 116. When the connecting panel end edge 122A is engaged with or adjacent to the intermediate rear wall 108, the first intermediate and inner side panels 132 and 126 are adjacent to and aligned with the first outer side panel 56 and the second intermediate and inner side panels 134 and 128 are adjacent to and aligned with the second outer side panel 58, see FIG. 8. In the illustrated embodiment, the end edge 122A of the connecting panel 122 frictionally engages with the base 100 so as to maintain the connecting panel 122 in proper position relative to the base 100.

Figure 4:
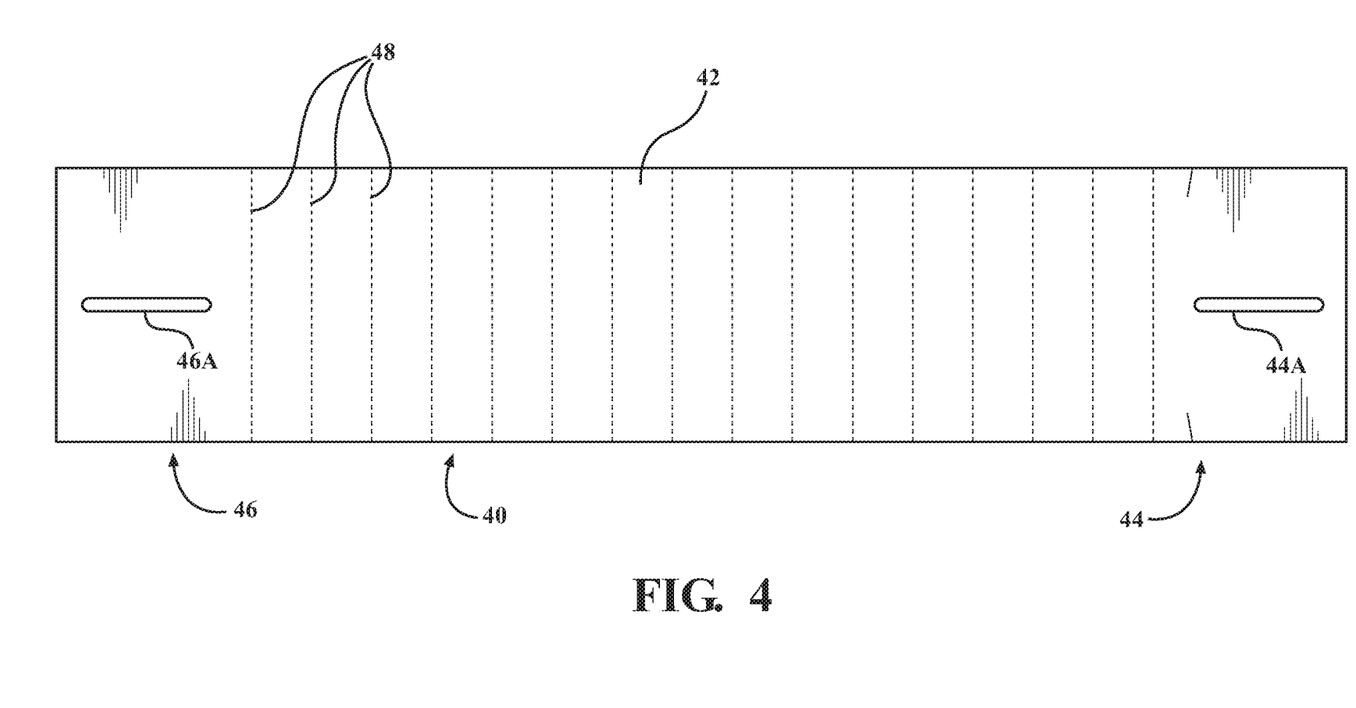
FIG. 4 illustrates a paperboard blank from which a paperboard sling of the releasable paperboard chock assembly of the present invention is formed.

The sling 40, which is illustrated in FIG. 4, has a generally rectangular shape and comprises a central section 42 and first and second opposing outer ends 44 and 46. The central section 42 includes a plurality of score lines 48 extending transversely to a longitudinal length of the sling 40 so as to allow the sling 40 to conform to the shape of the curved portions 204A and 206A of the upper edge surfaces 204 and 206 of the first and second side walls 104 and 106 of the first and second chocks 20 and 30.

To form the releasable paperboard chock assembly 10, opposing paperboard chocks, which define the first and second chocks 20 and 30 in FIG. 1, are spaced apart approximately the length of the sling 40. The first paperboard chock 20 comprises a first base 100, a first back wall 102, and first and second side walls 104 and 106 adjacent to the base 100, wherein each of the first and second side walls 104 and 106 comprises an upper edge surface 204 and 206 having a generally curved portion 204A and 206A to conform to a curved outer surface OS of a roll R to be secured, wherein the first back wall 102 comprises a lower edge 102B located near a support surface, which, in the embodiment illustrated in FIGS. 1 and 2, comprises an upper surface of a pallet P, and an upper edge 102C opposed to the lower edge 102B, see FIG. 9.

The second paperboard chock 30 comprising a second base 100, a second back wall 102, and third and fourth side walls 104 and 106 adjacent to the base 100, wherein each of the third and fourth side walls 104 and 106 comprises an upper edge surface 204 and 206 having a generally curved portion 204A and 206A to conform to the outer curved surface OS of the roll R to be secured.

The first and second chocks 20 and 30 are positioned such that the upper edge surfaces 204 and 206 of the first and second side walls 104 and 106 of the first chock 20 are facing towards the upper edge surfaces 204 and 206 of the third and fourth side walls 104 and 106 of the second chock 30. The paperboard sling 40 extends between the first and second chocks 20 and 30, see FIGS. 1 and 2, wherein the first and second ends 44 and 46 of the sling 40 are joined to the first and second chocks 20 and 30, respectively. In the illustrated embodiment, the sling first end 44 is joined to the first chock 20 only at the first back wall 102 of the first chock 20. Likewise, the sling second end 46 is joined to the second chock 30 only at the second back wall 102 of the second chock 30.

A roll R to be secured on a pallet P is positioned on the chock assembly 10 such that the roll R is located on the sling central section 42 with the first and second chocks 20 and 30 at least partially located under the sling 40 and the roll R. In FIGS. 1 and 2, first and second chock assemblies 10 are positioned side by side such that the roll R is concurrently positioned over both chock assemblies 10. The roll R is further secured on the pallet P via bands B which pass through a centrally located core C within the roll R. In the illustrated embodiment, the roll R comprises two large rolls $R_1$ and $R_2$ of paper positioned side by side and wrapped in paper, such that the two rolls $R_1$ and $R_2$ appear as a single roll R in FIGS. 1 and 2.

The first and second ends 44 and 46 of the sling 40 comprise openings 44A and 46A, which fit over the handles 110 of the first and second chocks 20 and 30.

Figure 10:
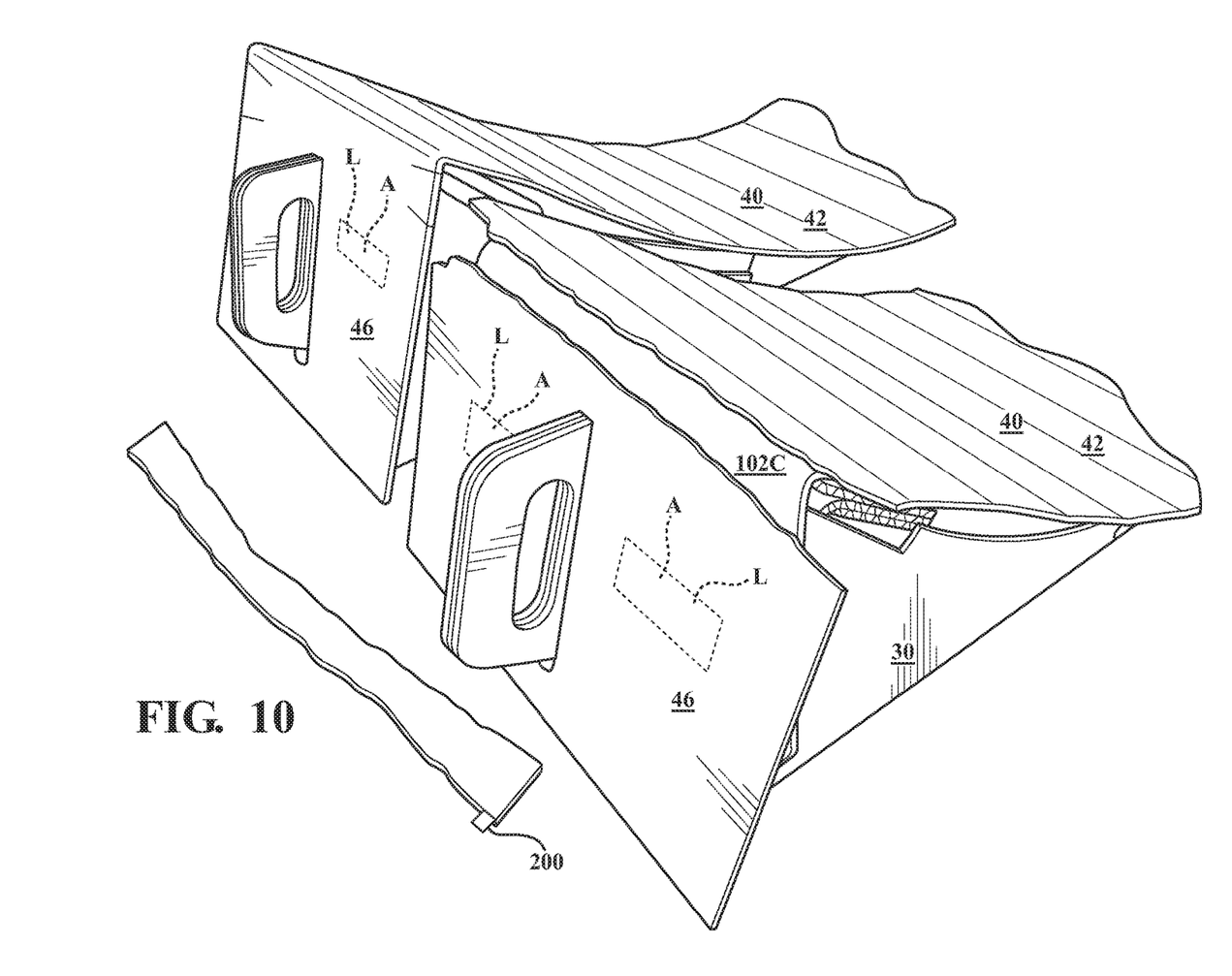
FIG. 10 is a perspective view of ends of a pair of chock assemblies wherein tear tape on one sling has been torn to separate a second end of a sling from a remainder of the sling so as to allow the corresponding chock to be removed.

The sling first outer end 44 may be secured to the first back wall 102 of the first chock 20 via adhesive A at one or more securement locations L on the first back wall 102 generally between the lower and upper edges 102B and 102C of the first back wall 102 or at the upper edge 102C, see FIG. 1. The sling second outer end 46 may be secured to the second back wall 102 of the second chock 30 via adhesive A at one or more securement locations L on the second back wall 102 generally between the lower and upper edges 102B and 102C of the second back wall 102 or at the upper edge 102C, see FIG. 10. It is also contemplated that the sling first and second outer ends 44, 46 may be secured to the first and second chocks 20, 30 mechanically, such as by staples or the like. It is further contemplated that one or both of the sling first and second outer ends 44, 46 may include an integral extension that is folded under the corresponding chock 20, 30, such that the weight of the chock 20, 30 and the roll R on the chock holds the sling end 44, 46 in position relative to the chock 20, 30.

Preferably, the first and second sling ends 44 and 46 are secured to the first and second chocks 20 and 30 only at the first and second back walls 102 of the first and second chocks 20 and 30 so as to allow one or both of the chocks 20 and 30 to be easily separated from the sling central section 42. Tear tape 200 may be secured at a location on each of the first and second sling outer ends 44 and 46 approximately between the first securement location(s) L and the upper edges 102C of the corresponding back walls 102 of the first and second chocks 20 and 30. When the tear tape 200 is pulled, a section of the sling outer end 44, 46 to which the tear tape 200 is secured is torn and removed, see FIG. 10. The tear tape 200 preferably extends across the entire width of each of the first and second outer ends 44, 46 of the sling 40 such that one or both of the first and second outer ends 44, 46 of the sling 40 are completely separated from the remaining portions of the sling 40, i.e., the central section 42 and the other of the first and second outer ends 44, 46 of the sling 40. For example, in FIG. 10, the tear tape 200 is shown after it has been pulled to separate the sling second outer end 46 from the central section 42 of the sling 40. Hence, the second chock 30 can be easily removed from the central section 42 of the sling 40.

Instead of using tear tape, it is contemplated that an area on each of the sling first and second outer ends 44, 46 located between the first securement location(s) L and the upper edge 102C of the back wall 102 can be severed to allow the sling first and/or second end 44, 46 and the corresponding chock 20, 30 to be separated from the remainder of the sling 40, i.e., the central section 42 and the other end 44, 46.

By securing the sling 40 to the first and second chocks 20 and 30, the sling 40 helps maintain the first and second chocks 20 and 30 at a desired spacing from one another so as to improve securement of the roll R on the pallet P. By securing at least one end 44, 46 of the sling 40 only on the back wall 102 of the corresponding chock 20, 30, the one end 44, 46 of the sling 40 and the corresponding chock 20, 30 can be easily separated from the remainder of the sling, i.e., the central section 44 and the other end 44, 46 of the sling 40. Hence, a chock 20, 30 can be easily separated from the central section 44 of the sling 40 so as to allow a corresponding roll $R_1$, $R_2$ to be released for use.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A releasable paperboard chock formed from a blank comprising a first section, a second section connected to the first section and a third section connected to the second section, the first section including a bottom panel and first and second outer side panels, the second section comprising a back panel and the third section comprising first and second inner side panels, the releasable paperboard chock comprising:
   a base defined by the bottom panel;
   a back wall defined by the back panel; and
   first and second side walls adjacent to the base and defined by the first and second outer side panels and the first and second inner side panels, wherein each of the first and second inner and outer side panels comprises an upper edge surface having at least a portion that is generally curved so as to conform to a curved surface of a roll to be secured.

2. The releasable paperboard chock as set out in claim 1, wherein the curved portion of the upper edge surface of each of the first and second inner and outer side panels defines an arc having an angle of from about 30 degrees to about 60 degrees.

3. The releasable paperboard chock as set out in claim 1, wherein the third section of the blank further comprises first and second intermediate side panels connected respectively to the first and second inner side panels and wherein the first and second side walls are further defined by the first and second intermediate side panels, such that the first intermediate side panel is located between the first outer and inner side panels and the second intermediate side panel is located between the second outer and inner side panels.

4. The releasable paperboard chock as set out in claim 1, wherein the first section of the blank further comprises first and second intermediate rear panels connected respectively to the first and second outer side panels via score lines and the releasable paperboard chock further comprises an intermediate rear wall positioned adjacent to the back wall and defined by the first and second intermediate rear panels.

5. The releasable paperboard chock as set out in claim 4, wherein the first section of the blank further comprises first and second handle sections connected respectively to the first and second intermediate rear panels by score lines and wherein the back wall comprises a slot through which the first and second handle sections extend so as to form a chock handle.

6. The releasable paperboard chock as set out in claim 4, wherein the first section of the blank further comprises first and second lower traversing panels connected respectively to the first and second intermediate rear panels via score lines and the releasable paperboard chock further comprises a lower traversing wall extending above and across a portion of the base and defined by the first and second lower traversing panels.

7. The releasable paperboard chock as set out in claim 6, wherein the second section of the blank further comprises an outer traversing panel connected to the back panel via a score line and the releasable paperboard chock further comprises an upper traversing wall extending over the lower traversing wall and defined by the outer traversing panel.

8. The releasable paperboard chock as set out in claim 7, wherein the upper edge surface of each of the first and second outer side panels comprises a further portion which defines a notch with the generally curved portion, the lower and upper traversing walls extending into the notch such that an outer surface of the upper traversing wall is generally even with the generally curved portions of the upper edge surfaces of the first and second outer side panels.

9. The releasable paperboard chock as set out in claim 7, wherein the third section of the blank further comprises a connecting panel joined to the outer traversing panel via a score line and also joined to the first and second inner side panels via score lines and the releasable paperboard chock further comprises a connecting wall joined to the first and second inner side panels and defined by the connecting panel.

10. A paperboard blank for use in forming a releasable paperboard chock comprising:
    a first section comprising a bottom panel and first and second outer side panels connected respectively to the bottom panel via score lines, wherein an outer edge surface of each of the first and second outer side panels comprises a generally curved portion;
    a second section comprising a back panel connected to the bottom panel by a score line; and
    a third section connected to the second section comprising first and second inner side panels, wherein an outer edge surface of each of the first and second inner side panels comprises a generally curved portion.

11. The paperboard blank as set out in claim 10, wherein the third section of the blank further comprises first and second intermediate side panels connected respectively to the first and second inner side panels via score lines, wherein an outer edge surface of each of the first and second intermediate side panels comprises a generally curved portion.

12. The paperboard blank as set out in claim 10, wherein the first section of the blank further comprises first and second intermediate rear panels connected respectively to the first and second outer side panels via score lines.

13. The paperboard blank as set out in claim 12, wherein the first section of the blank further comprises first and second handle sections connected respectively to the first and second intermediate rear panels by score lines and the back panel comprises a slot.

14. The paperboard blank as set out in claim 12, wherein the first section of the blank further comprises first and second lower traversing panels connected respectively to the first and second intermediate rear panels via score lines.

15. The paperboard blank as set out in claim 14, wherein the second section of the blank further comprises an outer traversing panel connected to the back panel via a score line.

16. The paperboard blank as set out in claim 15, wherein the third section of the blank further comprises a connecting panel joined to the outer traversing panel via a score line and also joined to the first and second inner side panels via score lines.

17. The paperboard blank as set out in claim 10, wherein the outer edge surface of each of the first and second outer side panels comprises a further portion which defines a notch with the generally curved portion.

18. The paperboard blank as set out in claim 10, wherein the blank comprises a dual layer paperboard blank.

19. The paperboard blank as set out in claim 10, wherein the curved portion of the outer edge surface of each of the first and second outer side panels comprises a radius of curvature of from about 20 inches to about 30 inches.

* * * * *